(12) United States Patent
Suzuki et al.

(10) Patent No.: US 8,151,819 B2
(45) Date of Patent: Apr. 10, 2012

(54) FLUID SUPPLY VALVE ATTACHMENT DEVICE

(75) Inventors: Hiroaki Suzuki, Nagoya (JP);
Munetoshi Kuroyanagi, Nukata (JP);
Takuya Suzuki, Anjo (JP); Kazushi Numazaki, Toyota (JP); Toshikatsu Kubo, Okazaki (JP); Toshihiko Shima, Okazaki (JP)

(73) Assignee: JTEKT Corporation, Osaka-shi (JP)

( * ) Notice: Subject to any disclaimer, the term of this patent is extended or adjusted under 35 U.S.C. 154(b) by 443 days.

(21) Appl. No.: 12/468,397

(22) Filed: May 19, 2009

(65) Prior Publication Data
US 2009/0283154 A1 Nov. 19, 2009

(30) Foreign Application Priority Data

May 19, 2008 (JP) ................................. 2008-131086

(51) Int. Cl.
*F16K 43/00* (2006.01)
*F16K 51/00* (2006.01)

(52) U.S. Cl. ................. 137/315.03; 137/320; 137/15.17; 251/129.15

(58) Field of Classification Search ............. 137/315.03, 137/15.17, 15.18, 320; 251/144, 129.15
See application file for complete search history.

(56) References Cited

U.S. PATENT DOCUMENTS 5,197,710 A * 3/1993 Wass et al. ............... 251/129.15
5,299,600 A * 4/1994 Aronovich ............... 137/625.65

FOREIGN PATENT DOCUMENTS

JP 2005-140195 6/2005

* cited by examiner

*Primary Examiner* — Dinh Nguyen
(74) *Attorney, Agent, or Firm* — Oblon, Spivak, McClelland, Maier & Neustadt, L.L.P.

(57) ABSTRACT

A fluid supply valve attachment device that has a tank, a fixing member in which a recessed fitting section is formed, a fluid supply valve that is inserted in and fixed to the recessed fitting section, a first seal member which seals a space between the tank and the fixing member, and a second seal member which seals a space between the fixing member and the fluid supply valve. The maximum inside diameter of the recessed fitting section is defined as D, a distance between a cross-sectional center of the first seal member and a cross-sectional center of the second seal member in a direction that a central axial line of the recessed fitting section extends in an attached state is defined as L1, and L1 is set within 2.5×D.

13 Claims, 8 Drawing Sheets

FLUID SUPPLY VALVE ATTACHMENT DEVICE

INCORPORATION BY REFERENCE

The disclosure of Japanese Patent Application No. 2008-131086 filed on May 19, 2008 including the specification, drawings and abstract is incorporated herein by reference in its entirety.

BACKGROUND OF THE INVENTION

1. Field of the Invention

The present invention relates to a fluid supply valve attachment device in which a fluid supply valve is fixedly attached to a tank that has a fluid tank chamber which stores fluid in a pressurized state.

2. Description of the Related Art

Figure 9:
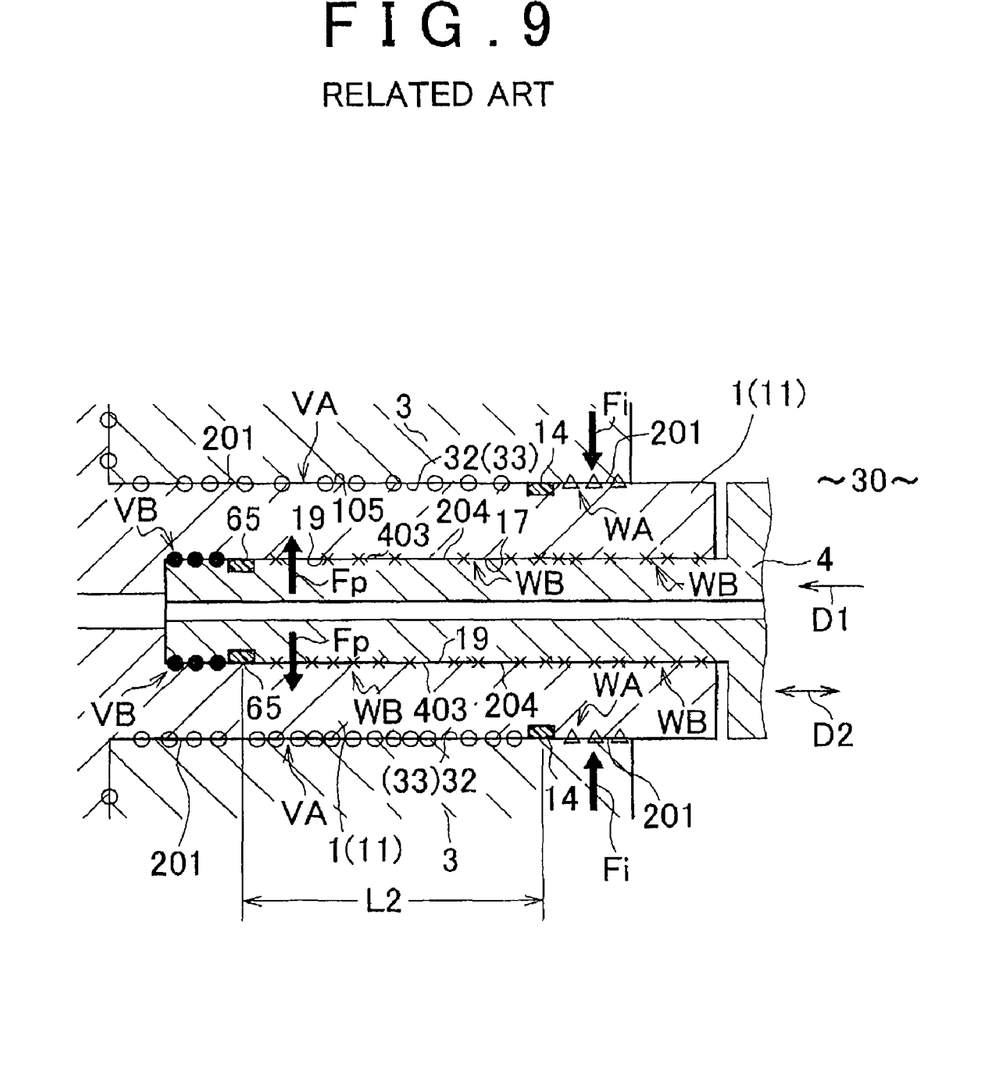
FIG. 9 is a cross-sectional view in accordance with a related art schematically showing the state that the protruded insertion section is fit to the recessed fitting section together with the first seal member and the second seal member.

Japanese Patent Application Publication No. 2005-140195 (JP-A-2005-140195) discloses a fluid supply valve attachment device in which a fluid supply valve is fixedly attached to a tank that has a tank chamber. FIG. 9 schematically shows the fluid supply valve attachment device. As shown in FIG. 9, the fluid supply valve attachment device has a tank 3 that has a tank chamber 30, a fixing member 1 that is fixed to the tank 3, and a fluid supply valve 4 that is inserted in the fixing member 1. The tank 3 has a mounting hole 32, a first inner peripheral surface 33 in which the mounting hole 32 is formed, and the tank chamber 30 that communicates with the mounting hole 32. The fixing member 1 is fixed to the mounting hole 32 of the tank 3 in a fit state and has a first outer peripheral surface 105 that faces the first inner peripheral surface 33 of the mounting hole 32, a recessed fitting section 17 that is disposed inside in the radial direction of the first outer peripheral surface 105 to open toward the tank chamber 30, and a second inner peripheral surface 19 that forms the recessed fitting section 17. The fluid supply valve 4 is inserted in the recessed fitting section 17 of the fixing member 1 to be mounted thereto and has a second outer peripheral surface 403 that faces the second inner peripheral surface 19 of the recessed fitting section 17. A first seal member 14 in a ring shape is provided between the first inner peripheral surface 33 of the tank 3 and the first outer peripheral surface 105 of the fixing member 1. The first seal member 14 seals a space between the first inner peripheral surface 33 of the tank 3 and the first outer peripheral surface 105 of the fixing member 1. Further, as shown in FIG. 9, a second seal member 65 in a ring shape is provided between the second inner peripheral surface 19 of the fixing member 1 and the second outer peripheral surface 403 of the fluid supply valve 4. The second seal member 65 seals a space between the second inner peripheral surface 19 of the fixing member 1 and the second outer peripheral surface 403 of the fluid supply valve 4 and has a ring shape with a diameter smaller than the first seal member 14. The first seal member 14 and the second seal member 65 prevent hydrogen that is stored in the tank chamber 30 of the tank 3 from leaking.

As shown in FIG. 9, in the device described above, the distance between the cross-sectional center of the first seal member 14 and the cross-sectional center of the second seal member 65 is denoted as L2. Even when the fluid supply valve 4 is closed, since the gas in the tank chamber 30 of the tank 3 is at high pressure, the gas inevitably enters a gap 201 between the first inner peripheral surface 33 of the mounting hole 32 of the tank 3 and the first outer peripheral surface 105 of the fixing member 1. In other words, it is considered that high-pressure gas enters an area WA (area indicated by Δ (triangle) in the gap 201) of the gap 201 that is located more adjacent to the tank chamber 30 than the first seal member 14. Therefore, in the area WA, pressure Fi (see FIG. 9) due to high-pressure gas is applied to the fixing member 1 in the radially inward direction.

However, it is not easy even for gas to move over the first seal member 14 in the direction D1. Therefore, it is considered that the pressure in an area VA (area indicated by ○ (circle) in the gap 201) of the gap 201 that is more away in the direction D1 from the tank chamber 30 than the first seal member 14 is substantially at the atmospheric pressure.

Further, the gas (hydrogen gas) at high pressure in the tank chamber 30 of the tank 3 also inevitably enters a gap 204 between the second inner peripheral surface 19 and the second outer peripheral surface 403. In this case, it is considered that the high-pressure gas enters an area WB (area indicated by × (cross) in the gap 204) of the gap 204 that is located more adjacent to the tank chamber 30 than the second seal member 65. Therefore, in the area WB, pressure Fp (see FIG. 9) due to high-pressure gas is applied to the fixing member 1 in the radially outward direction.

However, it is not easy even for gas to move over the second seal member 65 in the direction D1. Therefore, it is considered that the pressure in an area VB (area indicated by ● (filled circle) in the gap 204) of the gap 204 that is more away in the direction D1 from the tank chamber 30 than the second seal member 65 is closer to the atmospheric pressure than pressure in the area WB. In this case, the directions of the pressures Fp and Fi are opposite from each other, and thus both of the forces cancel each other.

However, as it can be understood from FIG. 9, if the distance L2 is provided in a manner such that the first seal member 14 and the second seal member 65 are remote from each other in the extending direction D2 in which the recessed fitting section 17 extends, it increases an area on which only the force in the direction Fp (radially outward direction) is applied to a first section 11 of the fixing member 1. In other words, only the force in the direction Fp that is oriented in the radially outward direction is applied in the distance L2. Therefore, this increases unnecessary load that the first section 11 of the fixing member 1 is deformed in the radially outward direction. In this case, since the pressure of the gas in the tank chamber 30 is high as described above, the load is large. Therefore, the first section 11 of the fixing member 1 may be deformed in the radially outward direction and may fatigue due to the deformation. Further, deformation of the first section 11 of the fixing member 1 may apply unexpected load to the first seal member 14. Particularly, in the case that the fixing member 1 is formed of an aluminum alloy, stainless steel, or the like that is relatively flexible metal to prevent hydrogen embrittlement, the influence by the load is large.

SUMMARY OF THE INVENTION

An object of the present invention is to provide a fluid supply valve attachment device which can prevent deformation or fatigue of a fixing member and a first seal member even when fluid that is stored in a tank chamber of a tank is at high pressure and can contribute to longevity of the fixing member and the first seal member.

In an aspect of the present invention, if the distance L2 (see FIG. 9) between a cross-sectional center of the first seal member and a cross-sectional center of the second seal member in an attached state is made as short as possible, the pressure Fp oriented in the radially outward direction and the pressure Fi oriented in the radially inward direction can be cancelled by each other at a higher cancellation ratio.

Specifically, a fluid supply valve attachment device in accordance with an aspect of the present invention includes: (i) a tank that has a first inner peripheral surface which forms a mounting hole and a fluid tank chamber that communicates with the mounting hole; (ii) a fixing member that is fit to the mounting hole of the tank, which has a first outer peripheral surface that faces the first inner peripheral surface of the mounting hole, a recessed fitting section that opens toward the fluid tank chamber and is formed radially inside than the first outer peripheral surface, and a second inner peripheral surface that forms the recessed fitting section; (iii) a fluid supply valve which has a second outer peripheral surface, and which is inserted in the recessed fitting section of the fixing member and faces the second inner peripheral surface of the recessed fitting section; (iv) a first seal member that is provided between the first inner peripheral surface of the mounting hole and the first outer peripheral surface of the fixing member and is formed of a ring-shaped sealing material to seal a space between the first inner peripheral surface of the mounting hole and the first outer peripheral surface of the fixing member; and (v) a second seal member that is provided between the second inner peripheral surface of the fixing member and the second outer peripheral surface of the fluid supply valve, sealing a space between the second inner peripheral surface of the fixing member and the second outer peripheral surface of the fluid supply valve, and is formed of a ring-shaped sealing material with a diameter smaller than the first seal member, in which (vi) the maximum inside diameter of the recessed fitting section is defined as D, a distance between a cross-sectional center of the first seal member and a cross-sectional center of the second seal member in the direction that the central axial line of the recessed fitting section extends is defined as L1, and L1 is set within $2.5 \times D$.

The fluid supply valve may be of any kind that has a valve body which is able to open and close the passage, such as on-off valve, flow regulation valve, pressure regulation valve, solenoid valve, and hand operated valve. The distance between the cross-sectional center of the first seal member and the cross-sectional center of the second seal member in the direction that the central axial line of the recessed fitting section extends is L1, L1 is set within $2.5 \times D$. Therefore, the cross-sectional center of the first seal member and the cross-sectional center of the second seal member are adjacently positioned in the direction that the central axial line of the recessed fitting section extends. This reduces unnecessary deformation of and load to the fixing member in the radially outward direction. Further, this reduces fatigue due to the deformation.

In this case, even if the fluid in the tank chamber is at high pressure, the load is reduced. As described above, the fluid supply valve attachment device facilitates prevention of deformation or fatigue of the fixing member. This will be an advantage particularly in the case that the fixing member is formed of relatively flexible metal such as aluminum alloys and stainless steel. Further, since the deformation of the fixing member in the radially outward direction is prevented, this facilitates prevention of unexpected load applied to the first seal member. In a case that a plurality of sealing sections are installed together in the same sealing groove, the cross-sectional center of the sealing section with the highest sealing capability may be made the center of the sealing sections.

In the aspect, L1 may be set within $2.0 \times D$, $1.8 \times D$, further $1.5 \times D$, $1.0 \times D$, $0.8 \times D$, or $0.5 \times D$. Thereby, the first seal member and the second seal member can be further adjacently positioned in the direction that the central axial line of the recessed fitting member extends.

In the aspect, the inside diameter of the mounting hole of the tank is defined as De, L1 may be set within $0.8 \times De$, $0.5 \times De$, or $0.3 \times De$. Further, L1 may be set within $0.2 \times De$ or $0.1 \times De$. Thereby, in the above aspect, the first seal member and the second seal member can be further more adjacently positioned.

In the fluid supply valve attachment device in accordance with the aspect, the first seal member may be disposed between the second seal member and the fluid tank chamber in the direction that the central axial line of the recessed fitting section extends. Conversely, the second seal member may be disposed between the first seal member and the fluid tank chamber. The first seal member and the second seal member may be disposed to partially overlap in the direction that the central axial line of the recessed fitting section extends. The first seal member and the second seal member may be disposed to completely overlap in the direction that the central axial line of the recessed fitting section extends.

The aspect of the present invention can provide the fluid supply valve attachment device which can contribute to long service life of the fixing member and the first seal member even when fluid stored in the tank chamber of the tank is at high pressure.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

First Embodiment

Figure 1:
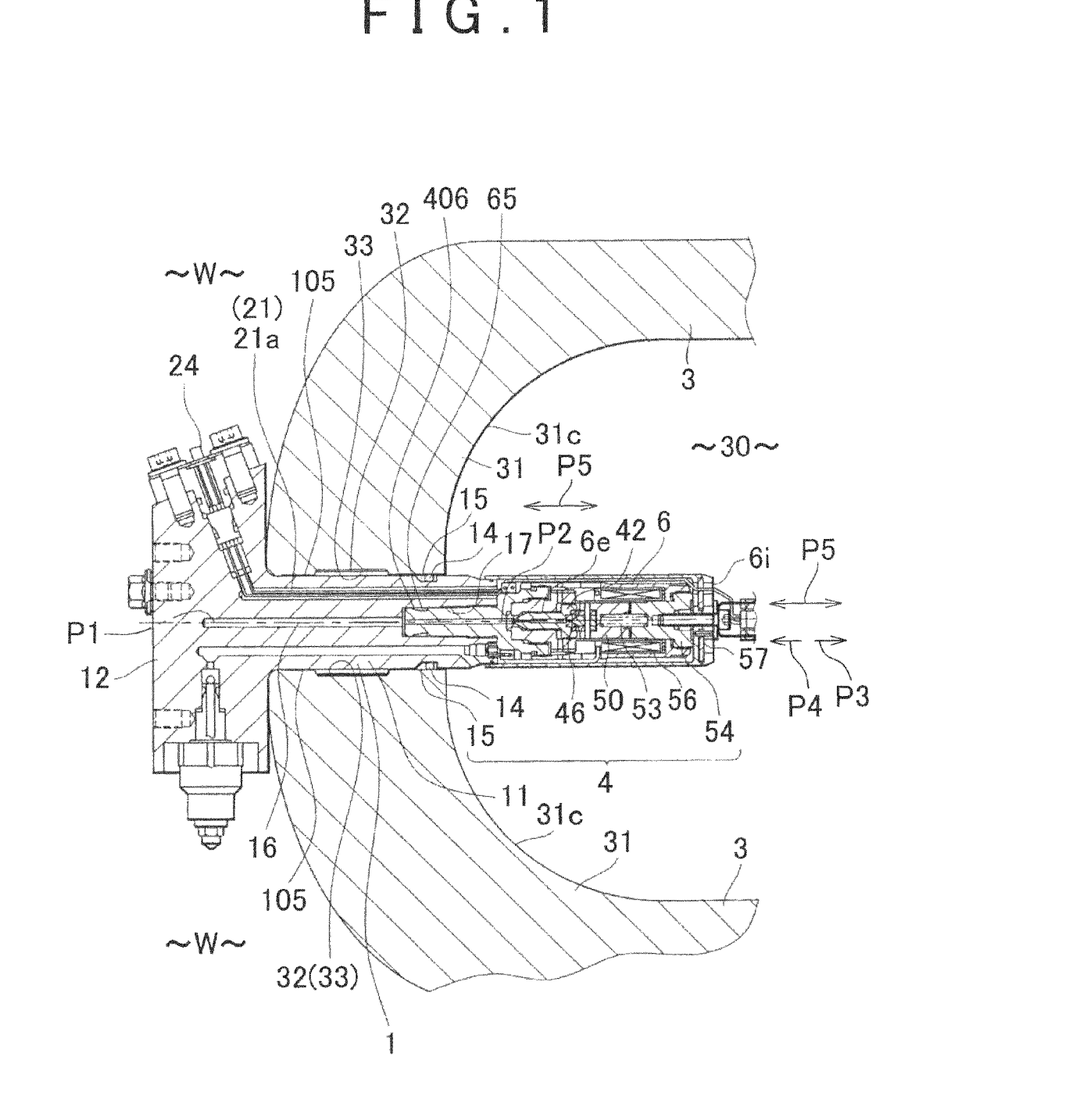
FIG. 1 is a cross-sectional view in accordance with a first embodiment showing a state that a fluid supply valve is mounted on a fixing member of a tank which stores high-pressure gas.
Figure 2:
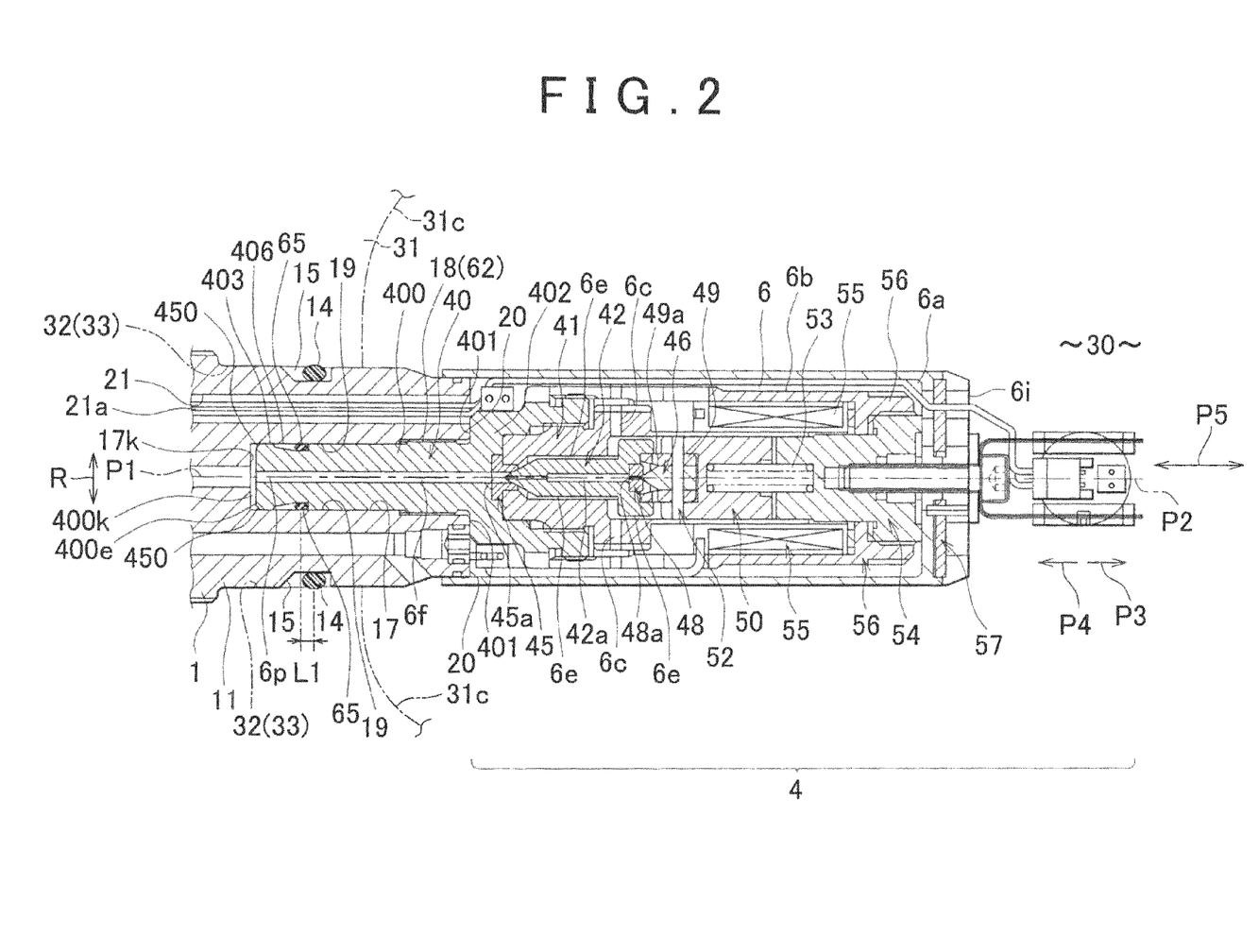
FIG. 2 is a partial cross-sectional view showing the state that the fluid supply valve is mounted on the fixing member of the tank which stores high-pressure gas on larger scale.

A first embodiment of the present invention will be described with reference to FIG. 1 to FIG. 6. The embodiment is applied to fuel cell systems for vehicles, electrical equipment, electronic equipment, fixed equipment, and so forth. As shown in FIG. 1 and FIG. 2, a fluid supply valve attachment device has a fixing member 1 and a fluid supply valve 4 detachably mounted on the fixing member 1. As shown in FIG. 1, the fixing member 1 is mounted on a mounting hole 32 of a tank wall 31 having an inner surface 31c forming a tank chamber 30 (fluid tank chamber) of a tank 3 which stores gas (anode gas such as hydrogen gas) at high pressure. High-pressure gas (hydrogen gas) is stored in the tank chamber 30. The pressure in the tank chamber 30 is higher than the atmospheric pressure and generally within a range of 10 to 250 MPa, 20 to 150 MPa, and 40 to 100 MPa. However, the pressure in the tank chamber 30 is not limited within the above ranges.

The fixing member 1 is to fix the fluid supply valve 4 to the tank 3 and has a shaft-shaped first portion 11 that is mounted on the mounting hole 32 of the tank wall 31 and a second section 12 in a flange shape installed consecutively with the first section 11 to be exposed to the ambient atmosphere W outside the tank 3. The second section 12 has a connector 24 (hermetic connector) that holds an electric wire which energizes the fluid supply valve 4.

As shown in FIG. 1, a first seal member 14 of a sealing material in a ring shape is disposed between a first outer peripheral surface 10S of the first section 11 of the fixing member 1 and a first inner peripheral surface 33 of the mounting hole 32 of the tank wall 31. The first seal member 14 is disposed in a first sealing groove 15 in a ring shape coaxially formed on the outer periphery of the first section 11 of the fixing member 1 and gas-tightly seals a space between the first outer peripheral surface 10S of the fixing member 1 and the first inner peripheral surface 33 of the mounting hole 32 of the tank 3.

As shown in FIG. 1, a first passage 16 is formed in the axial direction at the centeer of the first section 11 of the fixing member 1. Gas (hydrogen gas) as fluid passes through the first passage 16. The first passage 16 supplies gas (hydrogen gas) to a stack of fuel cells. A pressure reducing valve (not shown) is provided between an exit of the first passage 16 of the fixing member 1 and an anode (fuel electrode) of the stack of fuel cells.

As shown in FIG. 2, the fixing member 1 has a recessed fitting section 17 that is formed into a cylinder with a recess. The recessed fitting section 17 is coaxially formed in the first section 11 of the fixing member 1 and opens toward the tank chamber 30. An inner periphery of the recessed fitting section 17 has an internal thread 18 and a second inner peripheral surface 19 formed at the back of the internal thread 18 in the axial direction (in the direction away from the tank chamber 30 of the tank 3) and formed into a cylinder extending in the axial direction (along the central axial line P1 of the fixing member 1). In the recessed fitting section 17, the second inner peripheral surface 19 and the internal thread 18 are coaxially disposed with respect to the central axial line P1 of the fixing member 1.

A stopper surface 20 in a ring shape is formed to extend in the direction perpendicular to the axis of the fixing member 1 (radial direction, arrow R direction) on the fixing member 1. The stopper surface 20 is positioned in the section of fixing member 1 facing the tank chamber 30. Further, a wire hole 21 through which an electric wire 21a passes is formed in the fixing member 1.

As shown in FIG. 2, the fluid supply valve 4 is formed with a solenoid valve and has a protruded insertion section 40 in a cylindrical shape which is inserted in the recessed fitting section 17 of the fixing member 1 and detachably mounted thereto, a plug 41 in a tube shape which is partially fit to the protruded insertion section 40, a main poppet 42 which is partially fit to the plug 41 and functions as a tube-shaped valve having a pilot passage 42a, a main seat 45 on which an end of the main poppet 42 can be seated and which has a main opening 45a, a pilot poppet 46 in a tube shape, a pilot seat 48 on which an end of the pilot poppet 46 can be seated and which has a pilot opening 48a, a sub plug 49 that has a passage 49a which passes and penetrates through thereof in the radial direction, a plunger 50 in a tube shape, a pin 52 that couples the plunger 50, the pilot poppet 46, and the sub plug 49 together, a spring 53 in a coil shape which urges the plunger 50 in the valve-closing direction (arrow P4 direction), a stopper 54 in a tube shape, an excited coil 55 in a tube shape disposed outside of the stopper 54 and the plunger 50 in the radial direction, a yoke 56 for forming a magnetic path while the excited coil 55 is excited, and a filter 57 that faces the tank chamber 30 for removing dust.

The protruded insertion section 40 of the fluid supply valve 4 has the central axial line P2 coaxial with the central axial line P1 of the fixing member 1. While the excited coil 55 is not energized, the plunger 50 is urged in the valve-closing direction (arrow P4 direction) by the urging force of the spring 53, and the pilot poppet 46 is urged in the valve-closing direction (arrow P4 direction) via the pin 52, thereby closing the pilot opening 48a of the pilot seat 48. Further, the main poppet 42 is urged in the valve-closing direction (arrow P4 direction) and closes the main opening 45a of the main seat 45.

As shown in FIG. 2, a second passage 6 for flowing the gas in the tank chamber 30 of the tank 3 toward the first passage 16 is formed in the fluid supply valve 4. An exit 6p which is one end of the second passage 6 is formed coaxially with the protruded insertion section 40 and can communicate with the first passage 16 of the fixing member 1. An entrance 6i which is the other end of the second passage 6 faces the tank chamber 30 of the tank 3 as a fluid supply source. Specifically, the second passage 6 includes a passage 6a that communicates with the tank chamber 30 of the tank 3 via the entrance 6i, a passage 6b that is provided on the outer periphery side of the yoke 56, a passage 6c that is provided in the plug 41 to pass through the plug 41 in the radial direction thereof, a passage 6e that is formed on the outer periphery of the main poppet 42, the main opening 45a formed in the main seat 45, and a passage 6f that is formed at the center of the protruded insertion section 40.

In this embodiment, to open the fluid supply valve 4, the excited coil 55 is energized and excited. The magnetic path passing through the yoke 56 is then formed. Then, the plunger 50 moves in the valve-opening direction (arrow P3 direction) against the urging force of the spring 53. Now, the pilot poppet 46 moves in the valve-opening direction (arrow P3 direction) via the pin 52. The pilot opening 48a of the pilot seat 48 is released from the closed state. The high-pressure gas in the tank chamber 30 then flows through the entrance 6i, the passage 6b, a passage 49a of the sub plug 49, the pilot opening 48a, the pilot passage 42a of the main poppet 42, the main opening 45a of the main seat 45, and to the first passage 16 of the fixing member 1. This reduces the differential pressure between the pressure to move the main poppet 42 in the valve-closing direction (arrow P3 direction) and the pressure to move the main poppet 42 in the valve-opening direction (arrow P4 direction). Thereby, the main poppet 42 moves in the valve-opening direction (arrow P3 direction). The main opening 45a of the main seat 45 is released from the closed state. As a result, the high-pressure gas in the tank chamber 30 flows to the passage 6f of the protruded insertion section 40 via the passages 6b, 6c, and 6e, and the main opening 45a of the main seat 45, further to the first passage 16 of the fixing member 1, and to the anode (fuel electrode) of the stack of the fuel cells via the pressure reducing valve (not shown). To close the fluid supply valve 4, electric power supply to the excited coil 55 is stopped.

Figure 3:
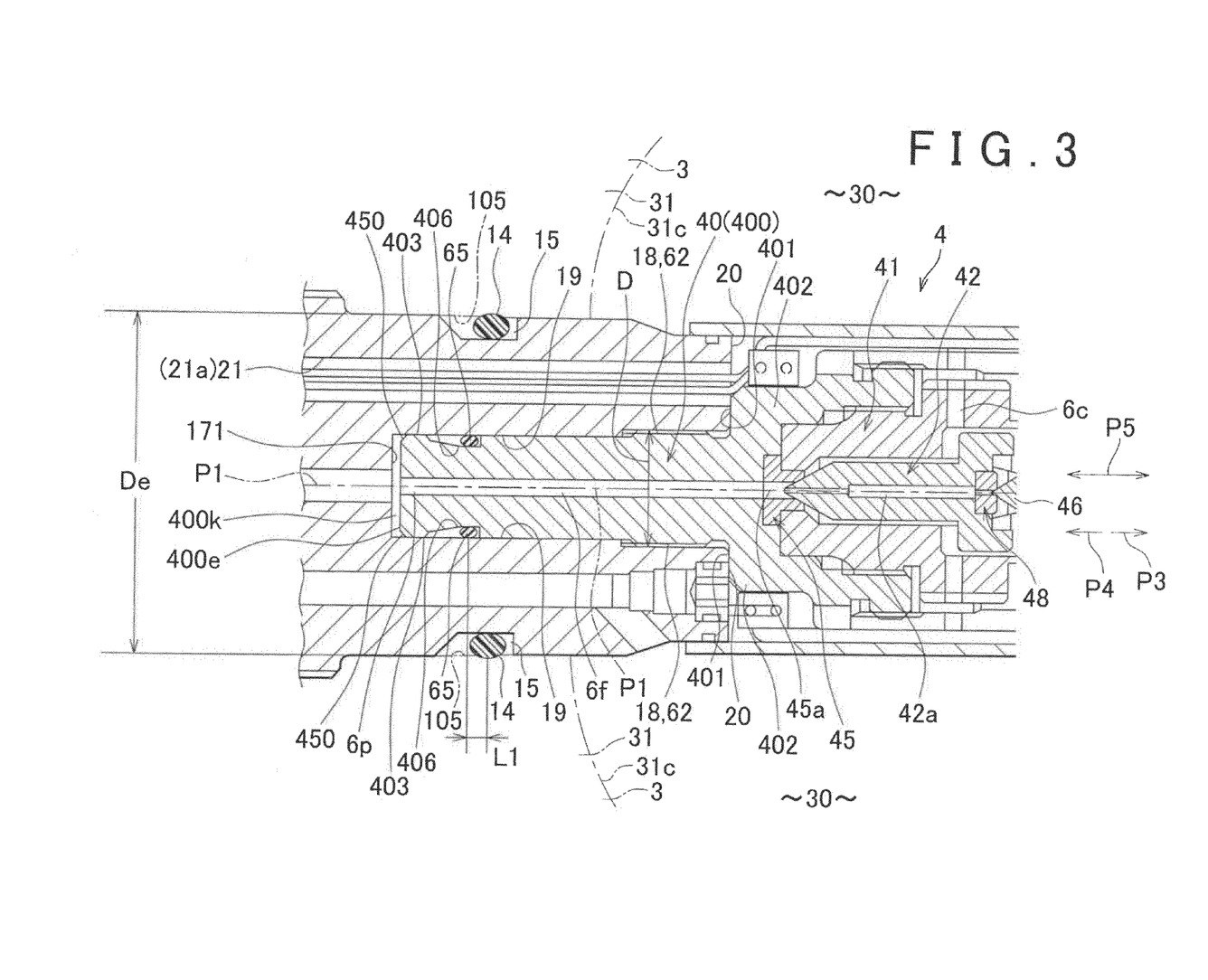
FIG. 3 is a partial cross-sectional view showing the state that the fluid supply valve is mounted on the fixing member of the tank which stores high-pressure gas on further larger scale.

As shown in FIG. 2 and FIG. 3, the protruded insertion section 40 of the fluid supply valve 4 has a shaft 400 in a cylindrical shape that has an external thread 62 to be screwed into the internal thread 18 of the recessed fitting section 17 on the outer peripheral surface, a flange 402 that is provided consecutively with an end of the shaft 400 adjacent to the tank chamber 30, extended in the direction perpendicular to the axis, and has a contact surface 401 in a ring shape, and a chamfered section 450 that is formed at an end of the shaft 400 away from the tank chamber 30, which are all coaxially provided.

As shown in FIG. 2 and FIG. 3, the shaft 400 has the external thread 62 to be screwed into the internal thread 18 and a second outer peripheral surface 403 in a cylindrical shape that is formed in a part deeper than the external thread 62 in the axial direction, in other words, on the side away from the tank chamber 30, which are all coaxially provided. The second outer peripheral surface 403 is in a cylindrical shape and is formed between the chamfered section 450 and the external thread 62 in the extending direction P5 that is the direction in which the protruded insertion section 40 extends.

When the external thread 62 and the internal thread 18 are screwed together, the protruded insertion section 40 moves in the direction away from the tank chamber 30 (arrow P4 direction). As a result, the contact surface 401 of the flange 402 of the protruded insertion section 40 contacts with the stopper surface 20 of the fixing member 1. Therefore, the protruded insertion section 40 is positioned in the extending direction P5.

The nominal diameter of the external thread 62 (metric thread) of the protruded insertion section 40 of the fluid supply valve 4 is set to 14 millimeters. The outside diameter of the external thread 62 (the diameter of the hypothetical cylinder tangent to the thread ridge of the external thread 62) is 14 millimeters. The pitch is set to 1 millimeter. The root diameter of the external thread 62 (the diameter of the hypothetical cylinder tangent to the root of the external thread 62) of the protruded insertion section 40 of the fluid supply valve 4 is 12.917 millimeters and the effective diameter thereof is 13.35 millimeters. The effective diameter is the diameter of the hypothetical cylinder such that the groove width of the internal thread 18 equals to the thread ridge width of the external thread 62. However, the nominal diameter, pitch, effective diameter, and so forth are not limited to the above values, but may be changed according to need. The pitch can be set within a range of 0.3 to 10 millimeters.

In accordance with this embodiment, a gap a2 formed between the internal thread 18 of the recessed fitting section 17 and the external thread 62 of the protruded insertion section 40 is set to be the maximum value or a value around the maximum value in the allowable gap widths on Japanese Industrial Standards (JIS). Specifically, the gap a2 (see FIG. 4) between the internal thread 18 of the recessed fitting section 17 and the external thread 62 of the protruded insertion section 40 is set not less than 60 micrometers. Particularly, it is preferable that the gap a2 be set not less than 90 micrometers or not less than 100 micrometers. The upper limit of the gap a2 between the internal thread 18 of the recessed fitting section 17 and the external thread 62 of the protruded insertion section 40 can be 400 micrometers or 500 micrometers. In accordance with the related art, the gap a2 between the internal thread 18 and the external thread 62 is set to about 26 micrometers. In accordance with this embodiment as described above, the internal thread 18 and the external thread 62 are slightly loosely screwed together.

Figure 5:
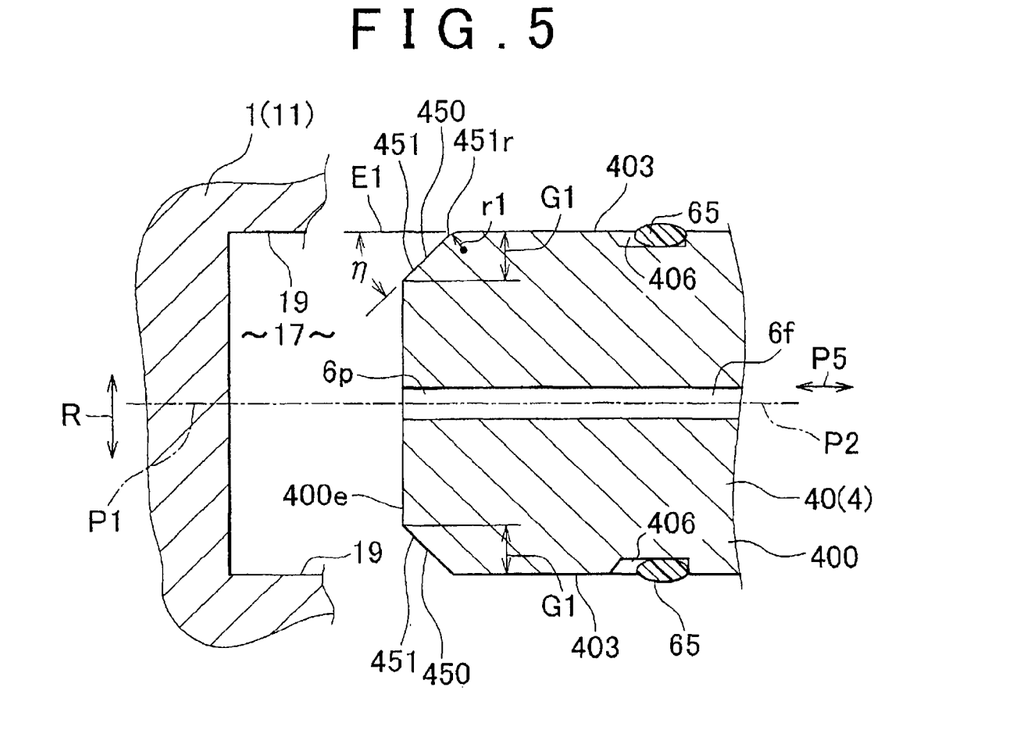
FIG. 5 is a cross-sectional view showing a state immediately before a protruded insertion section is fit to a recessed fitting section.

FIG. 5 shows a vicinity of the chamfered section 450. As shown in FIG. 5, the chamfered section 450 has a chamfered outer peripheral surface 451 that is provided along the circumference around the central axial line P2. The chamfered outer peripheral surface 451 is formed into a conical surface whose outside diameter gradually decreases toward an end surface 400e at the end of the shaft 400 away from the tank chamber 30.

Next, descriptions will be made about a case that the fluid supply valve 4 is mounted on the fixing member 1 mounted on the tank 3. In this case, in a state that the fluid supply valve 4 is disposed in the tank 30 so that the central axial line P1 of the fixing member 1 and the central axial line P2 of the protruded insertion section 40 of the fluid supply valve 4 are coaxial, the protruded insertion section 40 of the fluid supply valve 4 is disposed to face the recessed fitting section 17 of the fixing member 1. In this state, the fluid supply valve 4 together with the protruded insertion section 40 is rotated around the central axial line P1 with respect to the recessed fitting section 17 of the fixing member 1. Thereby, the external thread 62 of the protruded insertion section 40 of the fluid supply valve 4 is screwed into the internal thread 18 of the recessed fitting section 17 of the fixing member 1. When the contact surface 401 of the flange 402 of the protruded insertion section 40 contacts the stopper surface 20 of the fixing member 1, the positioning of the protruded insertion section 40 of the fluid supply valve 4 in the extending direction P5 is completed. At this point, as shown in FIG. 2 and FIG. 3, a gap 400k is formed between the end surface 400e of the protruded insertion section 40 and a bottom surface 171 of the recessed fitting section 17. This facilitates obtainment of the stopper function by the contact surface 401 and the stopper surface 20.

As described above, the protruded insertion section 40 of the fluid supply valve 4 is detachably fit to the recessed fitting section 17 of the fixing member 1, thereby mounting the fluid supply valve 4. During the mounting in such a manner (see FIG. 4), the chamfered outer peripheral surface 451 of the chamfered section 450 functions as a guide in the radial direction (arrow R direction). The second outer peripheral surface 403 of the guided shaft 400 in the protruded insertion section 40 contacts or is positioned adjacently to the second inner peripheral surface 19 of the recessed fitting section 17. This restrains the position of the protruded insertion section 40 of the fluid supply valve 4 in the radial direction (arrow R direction, direction perpendicular to the axis) (first restrained state).

When the internal thread 18 of the recessed fitting section 17 and the external thread 62 of the protruded insertion section 40 are screwed together, this restrains the position of the protruded insertion section 40 in the radial direction (arrow R direction, direction perpendicular to the axis) (second restrained state).

Hypothetically, if the restraint by the second restrained state were preferred rather than the restraint by the first restrained state, the internal thread 18 of the recessed fitting section 17 and the external thread 62 of the protruded insertion section 40 would be screwed together. However, the second outer peripheral surface 403 of the shaft 400 of the protruded insertion section 40 would be forced into contacting the second inner peripheral surface 19 of the recessed fitting section 17. This might cause "scoring" on the second outer peripheral surface 403 and the second inner peripheral surface 19. Particularly, the recessed fitting section 17 and the protruded insertion section 40 are formed with metal (hydrogen embrittlement resistant metal) such as aluminum alloys and stainless steel (for example, SUS304 and SUS316) to prevent hydrogen embrittlement of the sections and thus are flexible to a certain extent. Therefore, "scoring" described above is apt to occur.

In view of this point, in accordance with this embodiment, the first restrained state is preferred rather than the second restrained state as described above. Therefore, the gap a2 between the internal thread 18 of the recessed fitting section 17 and the external thread 62 of the protruded insertion section 40 in the radial direction (see FIG. 4, the gap in the radial direction is 0.5×a2) is set to a slightly large value such as not less than 90 micrometers or not less than 100 micrometers. As a result, the gap a2 is set to the maximum allowable thread gap between the internal thread 18 of the recessed fitting section 17 and the external thread 62 of the protruded insertion section 40 or a value close thereto. A gap a1 formed between the second inner peripheral surface 19 and the second outer peripheral surface 403 in the radial direction is set smaller than the gap a2.

As a result, the second restrained state is not preferred, but the first restrained state is preferred rather than the second restrained state. In other words, the second outer peripheral surface 403 of the shaft 400 of the protruded insertion section 40 contacts the second inner peripheral surface 19 of the recessed fitting section 17, thereby preferentially restraining the position of the protruded insertion section 40 in the radial direction (arrow R direction, direction perpendicular to the axis). Therefore, differently from the related art, "scoring" on the second outer peripheral surface 403 of the shaft 400 and the second inner peripheral surface 19 of the recessed fitting section 17 is effectively prevented. This further effectively prevents "sticking due to scoring". Particularly, even in the case that the shaft 400 and the recessed fitting section 17 are formed of relatively flexible metal such as aluminum alloys and stainless steel, "scoring" and further "sticking due to scoring" are effectively prevented.

Figure 4:
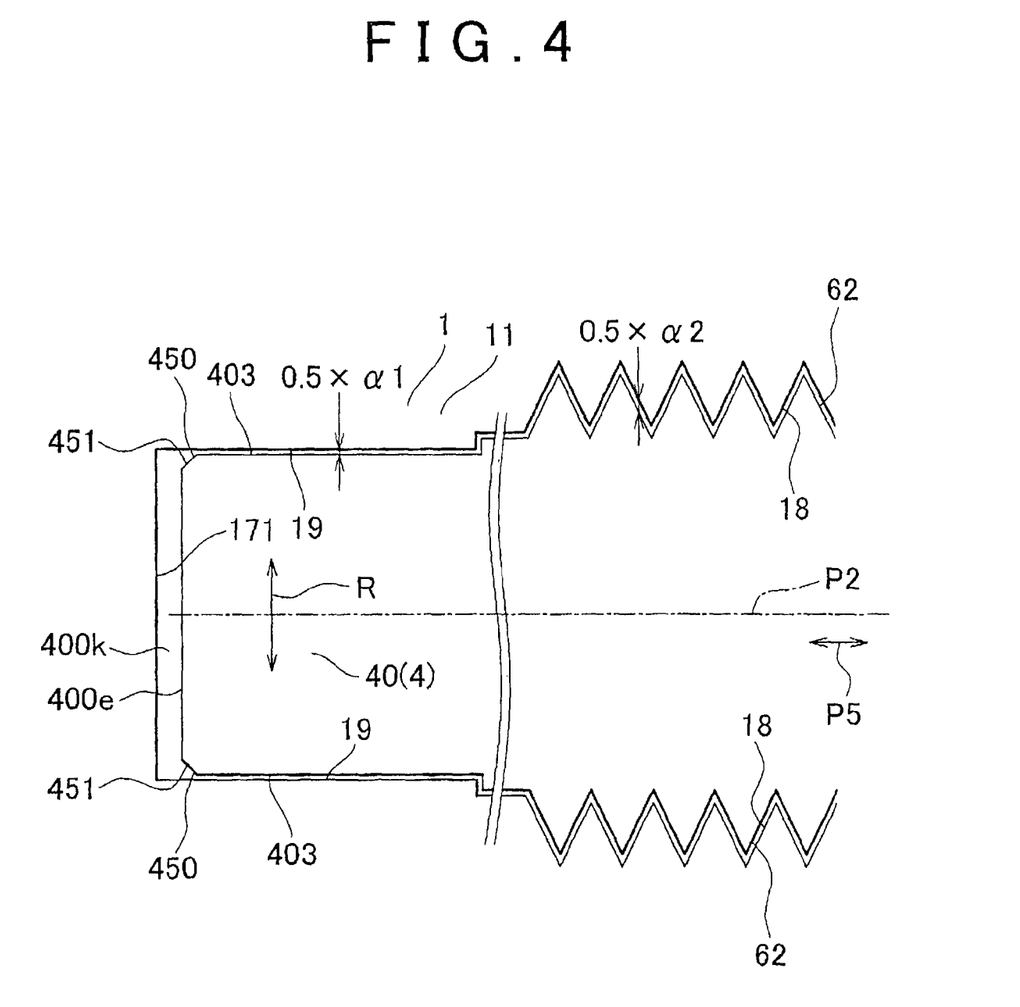
FIG. 4 is a cross-sectional view schematically showing a gap a1 formed between an inner peripheral surface and an outer peripheral surface in the radial direction and a gap a2 formed between an internal thread and an external thread in the radial direction.

In accordance with this embodiment, in FIG. 4, the gap formed between the second inner peripheral surface 19 and the second outer peripheral surface 403 in the radial direction is a1 (0.5×a1 in the radius), the gap formed between the internal thread 18 and the external thread 62 in the radial direction is a2 (0.5×a2 in the radius), and the axial offset between the central axial line of the external thread 62 and the central axial line of the second outer peripheral surface 403 in the radial direction is β, the variables are set to satisfy the following equations (1) to (3).

Now, when the protruded insertion section 40 of the fluid supply valve 4 is fit to the recessed fitting section 17, in FIG. 4, the total gap between the second inner peripheral surface 19 and the second outer peripheral surface 403 on both sides in the radial direction is a1, the gap on one side in the radial direction is 0.5×a1, the total gap between the internal thread 18 and the external thread 62 on both sides in the radial direction is a2, and the gap on one side in the radial direction is 0.5×a2.

To facilitate the fitting of the protruded insertion section 40 of the fluid supply valve 4 to the recessed fitting section 17, it is preferable that the relationship in the equation (1) be satisfied, considering that the fitting is made while the central axial line P2 of the protruded insertion section 40 of the fluid supply valve 4 is inclined with respect to the central axial line P1 of the recessed fitting section 17. The equation (1) becomes the equations (2) and (3) when it is expanded.

$$0.5 \times a1 + 0.5 \times a2 > \beta \quad (1),$$

$$a2 > (2\beta - a1) \quad (2),$$

and $$a2 > \{(2\beta - a1) \times N\} \quad (3).$$

Herein, N is an arbitrary value not less than 1.00. An exemplary case is a range of N=1.00 to 3.00, N=1.00 to 1.50, or N=1.00 to 1.20. If N is large, the gap a2 formed between the internal thread 18 and the external thread 62 becomes large. The restraint by the screwed connection between the internal thread 18 and the external thread 62 becomes loose. As a result, the restraining force in the radial direction decreases. Therefore, the restraint by the first restrained state is preferred rather than the restraint by the second restrained state.

It is preferable that the gap a1 be small since it influences the sealing capability of a second seal member 65. Therefore, in accordance with this embodiment, when the nominal diameter of the external thread 62 is 14 millimeters, the gap a1 is set within a range of 104 to 304 micrometers. However, the gap is not limited to this. Considering the equation (3), if a1 is set small, a2 is set large.

Figure 6:
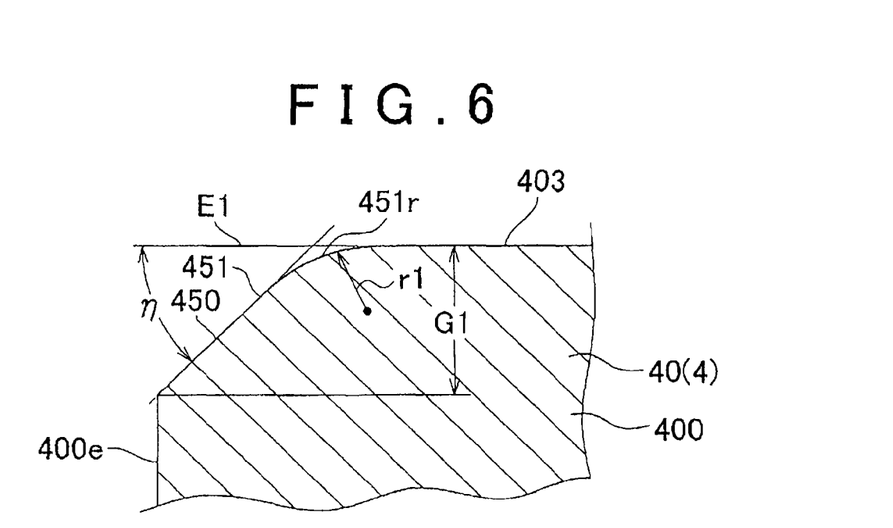
FIG. 6 is a cross-sectional view showing a vicinity of a chamfered section of the protruded insertion section on larger scale.

Next, descriptions will be made about the guide function of the chamfered section 450 in the shape of a conical surface with reference to FIG. 5 and FIG. 6. FIG. 5 and FIG. 6 show cross-sections of the protruded insertion section 40 taken along the central axial line P2. To enhance the guide function of the chamfered section 450 in the radial direction, it is preferable that the difference between the maximum diameter and the minimum diameter in the chamfered outer peripheral surface 451 of the chamfered section 450 be larger. Therefore, in accordance with this embodiment, as shown in FIG. 5 and FIG. 6, the angle between a hypothetical line E1 in parallel with the central axial line P2 of the protruded insertion section 40 and the chamfered outer peripheral surface 451 of the chamfered section 450 is defined as a chamfer angle η, the chamfer angle η is set not less than 40°. Specifically, the chamfer angle η is set large such as within a range of 45° to 70° and, particularly, 55° to 70°. As a result, the difference between the maximum diameter and the minimum diameter in the chamfered outer peripheral surface 451 of the chamfered section 450 can be increased in size. Therefore, a guide width G1 in the chamfered outer peripheral surface 451 of the chamfered section 450 can be increased. This allows enhancement of the guide function of the chamfered section 450 in the radial direction (arrow R direction). Accordingly, this facilitates the screw connection between the external thread 62 and the internal thread 18. In the related art, the chamfered angle η is 30° at the most.

In order to prevent mechanical damage and the like to the protruded insertion section 40 and the recessed fitting section 17 when the protruded insertion section 40 is inserted in the recessed fitting section 17, it is preferable that the second outer peripheral surface 403 of the protruded insertion section 40 be gently brought into contact with the second inner peripheral surface 19 of the recessed fitting section 17 in the radial direction (arrow R direction). Therefore, in accordance with this embodiment, as shown in FIG. 5 and FIG. 6, the section in the chamfered section 450 in which the outside diameter is the largest is formed into a convex rounded surface 451r having a curvature radius r1. As a result, a shock due to contact in the radial direction (arrow R direction) can be reduced as much as possible when the protruded insertion section 40 of the fluid supply valve 4 enters the deeper side with respect to the recessed fitting section 17 of the fixing member 1. In other words, the second outer peripheral surface 403 of the protruded insertion section 40 is gently brought into contact with the second inner peripheral surface 19 of the recessed fitting section 17, thereby facilitating the restraint in the radial direction. This further facilitates securement of the sealing property of the second seal member 65 by reducing the gap a1 described above and prevention of mechanical damage and the like to the second outer peripheral surface 403 and the second inner peripheral surface 19.

In accordance with this embodiment, the screw connection between the internal thread 18 and the external thread 62 has not been started at the point of the start of restraint that the chamfered section 450 is restrained by the second inner peripheral surface 19. The screw connection between the internal thread 18 and the external thread 62 is started after the second outer peripheral surface 403 is restrained by the second inner peripheral surface 19 in the radial direction to a certain degree.

In accordance with this embodiment, as described above, the external thread 62 of the protruded insertion section 40 of the fluid supply valve 4 is screwed into the internal thread 18 of the recessed fitting section 17 of the fixing member 1, thereby mounting the protruded insertion section 40 of the fluid supply valve 4 on the recessed fitting section 17 of the fixing member 1. In this case, in accordance with this embodiment, when the position of the protruded insertion section 40 of the fluid supply valve 4 is restrained in the radial direction thereof (arrow R direction, direction perpendicular to the axis), as described above, the first restrained state is preferred rather than the second restrained state. The standards for the first restrained state is the outside diameter of the second outer peripheral surface 403 and the inside diameter of the second inner peripheral surface 19. A second sealing groove 406 in a ring shape is coaxially formed on the second outer peripheral surface 403. The second seal member 65 in a ring shape formed of a sealing material is disposed in the second sealing groove 406. The second seal member 65 is elastically deformed to enhance sealing capability in the state that sealing is made with the second seal member 65. As described above, in accordance with this embodiment, the second seal member 65 is provided on the second outer peripheral surface 403 of the protruded insertion section 40, which is the standard for the first restrained state and is to prevent "scoring". This facilitates uniform elastic deformation of the second seal member 65 in the radial direction (arrow R direction). This further facilitates prevention of non-uniformity in the elastic deformation of the second seal member 65. Therefore, an advantage can be obtained that the sealing capability of the second seal member 65 can be effectively enhanced.

Figure 8:
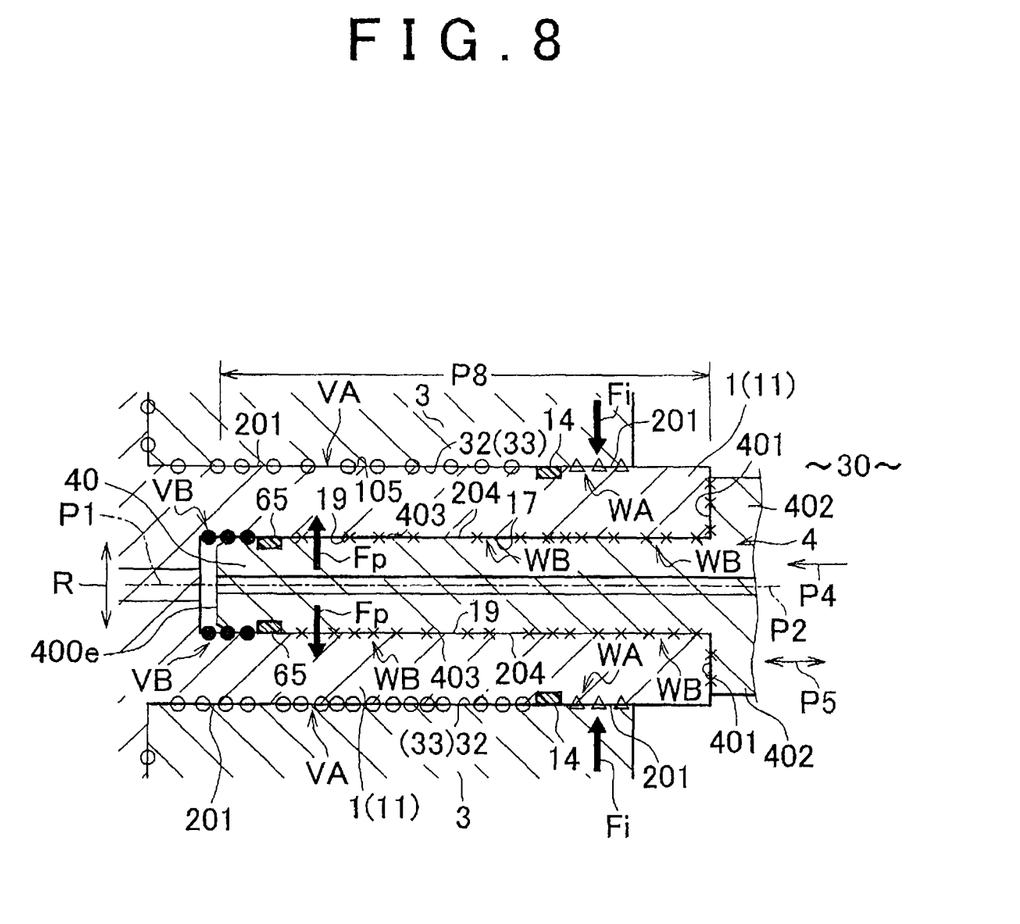
FIG. 8 is a cross-sectional view in accordance with a comparative example schematically showing a state that the protruded insertion section is fit to the recessed fitting section together with the first seal member and the second seal member.

FIG. 8 shows a comparative example of this embodiment. Elements same as this embodiment will be denoted by the same reference numerals and symbols. In the comparative example, a configuration is applied that increases the distance P8 from the contact surface 401 of the flange 402 to the end surface 400e of the protruded insertion section 40 in the direction P5 that the central axial line P2 of the protruded insertion section 40 extends. Therefore, even if the central axial line P2 of the protruded insertion section 40 is minutely inclined with respect to the central axial line P1 of the fixing member 1 when the fluid supply valve 4 is mounted, the offset amount of the end surface 400e of the protruded insertion section 40 in the radial direction (arrow R direction, direction perpendicular to the axis) increases. Therefore, it is not preferable for improvement in the mount accuracy of the fluid supply valve 4. Accordingly, in accordance with the first embodiment, a shorter configuration is applied that shortens the distance P8 from the contact surface 401 of the flange 402 to the end surface 400e of the protruded insertion section 40.

In other words, as shown in FIG. 1, as described above, the first seal member 14 is disposed between the first outer peripheral surface 105 of the fixing member 1 and the first inner peripheral surface 33 of the mounting hole 32 of the tank 3. The first seal member 14 is disposed at a position more adjacent to the tank chamber 30 than the position outside the tank 3 in the ambient atmosphere W in the direction P5 that the central axial line P2 of the protruded insertion section 40 extends. Further, as shown in FIG. 2 and FIG. 3, the position of the second seal member 65 is adjacent to the position of the first seal member 14 in the extending direction P5. Now, the distance between the cross-sectional center of the first seal member 14 and the cross-sectional center of the second seal member 65 is denoted by L1 (see FIG. 2 and FIG. 3). The distance L1 is set smaller than the maximum inside diameter D of the recessed fitting section 17. Therefore, in accordance with this embodiment, the distance from the contact surface 401 of the flange 402 to the end surface 400e of the protruded insertion section 40 in the extending direction P5 can be made as short as possible. This facilitates an improvement in the mount accuracy of the fluid supply valve 4.

In accordance with this embodiment, as shown in FIG. 2 and FIG. 3, the first seal member 14 and the second seal member 65 are adjacent to each other in the extending direction P5. Now, the distance between the cross-sectional center of the first seal member 14 and the cross-sectional center of the second seal member 65 is denoted by L1 (see FIG. 2, L1<L2). Specifically, the maximum inside diameter of the recessed fitting section 17 is defined as D [millimeter], L1 [millimeter] is set within 2.5×D along the central axial line P1 (in the extending direction P5) of the recessed fitting section 17. Specifically, L1 is set within 1.0×D or 0.5×D. The maximum inside diameter D of the recessed fitting section 17 is the maximum inside diameter of the internal thread 18.

The distance L1 is shorter than the diameter of and further the radius of the second outer peripheral surface 403. Therefore, in accordance with this embodiment, the ratio that the force in the arrow Fi direction and the force in the arrow Fp direction are cancelled by each other is improved, differently from the related art shown in FIG. 9. This prevents deformation of the first section 11 of the fixing section 1 in the radially outward direction. This further prevents fatigue due to the deformation. This facilitates prevention of a problem such that unexpected load is applied to the first seal member 14 and the second seal member 65.

In accordance with this embodiment, the inside diameter of the mounting hole 32 of the tank 3 is defined as De [millimeter], L1 [millimeter] is set within 0.3×De. Specifically, L1 is set within 0.2×De or 0.1×De. The distance L1 between the cross-sectional center of the first seal member 14 and the cross-sectional center of the second seal member 65 corresponds to the distance between the center of the sealing groove 15 holding the first seal member 14 and the center of the sealing groove 406 holding the second seal member 65 in the extending direction P5.

Second Embodiment

Figure 7:
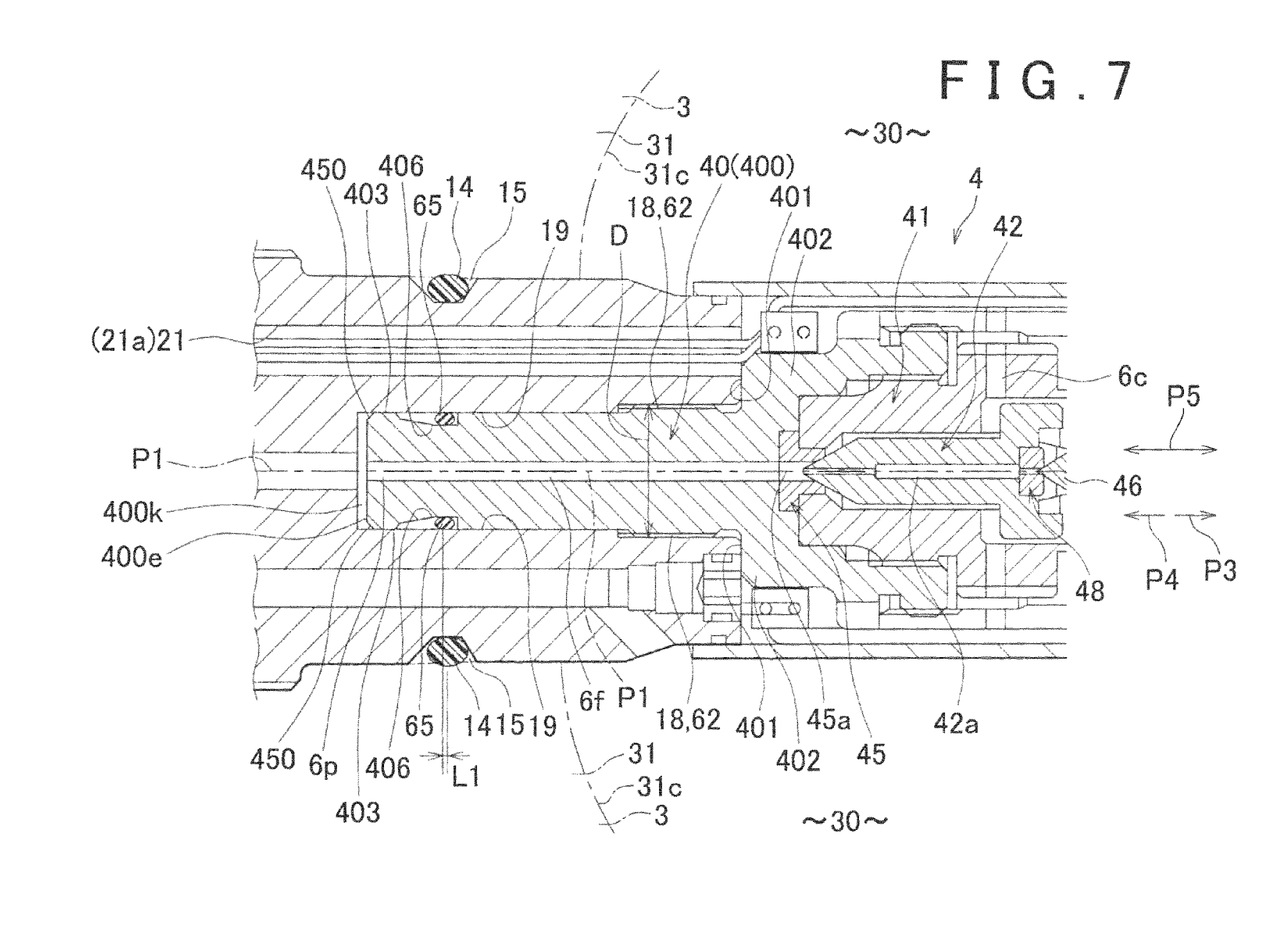
FIG. 7 is a cross-sectional view in accordance with a second embodiment showing a vicinity of a first seal member and a second seal member.

FIG. 7 illustrates a second embodiment. This embodiment basically has configuration and effect similar to the first embodiment. Descriptions will be made hereinafter mainly about different elements. FIG. 7 shows the cross-section of the protruded insertion section 40 of the fluid supply valve 4 taken along the central axial line P2. As shown in FIG. 7, the first seal member 14 and the second seal member 65 are disposed to overlap with each other in the extending direction P5 in large sections. Therefore, the distance between the cross-sectional center of the first seal member 14 and the cross-sectional center of the second seal member 65 in the attached state is defined as L1 [millimeter], L1 is set within 0.3×D (L1<D). Specifically, the relationship of L1<0.2×D is set. In this embodiment, deformation or fatigue of the fixing member 1 can be prevented. Accordingly, this contributes to longevity of the first seal member 14 and the second seal member 65.

Other Embodiment

The nominal diameter, the outside diameter, and the root diameter of the external thread 62 are not limited to the above values, but may be appropriately changed in response to the kinds of the fixing member 1 and the fluid supply valve 4. As described above, the nominal diameter of the external thread 62 is not limited to the above value. A range of 0.99 to 355 millimeters is exemplified. In this case, if the thread pitch is 0.2 to 8 millimeters, the gap a2 is, for example, set within a range of 6 to 1,840 micrometers in response to the nominal diameter of the external thread 62.

In the above embodiment, descriptions are made about a case that the first seal member 14 is disposed between the second seal member 65 and the fluid tank chamber 30 in the direction that the central axial line of the recessed fitting section 17 extends. However, the present invention is applicable to a case that the second seal member 65 is disposed between the first seal member 14 and the fluid tank chamber 30.

In the first and second embodiments, descriptions are made about cases that the first seal member 14 and the second seal member 65 are remotely disposed and that the first seal member 14 partially overlaps with the second seal member 65. However, the first seal member 14 and the second seal member 65 may be disposed to completely overlap with each other. Specifically, the distance L1 between the cross-sectional center of the first seal member 14 and the cross-sectional center of the second seal member 65 is set to zero. In the case that the seal members are disposed to completely overlap and the distance L1 is set to zero as described above, the ratio that the force in the direction Fi and the force in the direction Fp cancel each other is 100%.

In accordance with the embodiments described above, the tank 3 stores high pressure hydrogen gas. However, the gas may be fuel gas of hydrocarbon type such as methane gas that can be reformer fuel for a fuel cell. Further, the gas may be purging gas for purging process of a fuel cell and a reformer such as argon gas and nitrogen gas and may be another high-pressure gas such as oxygen gas that functions as cathode gas. The embodiments described above are applied to fuel cell systems. However, the present invention is not limited to this, but is applicable to other systems. The present invention is not limited to the above-mentioned embodiments that are illustrated in the respective figures, and can be changed accordingly without departing from the scope thereof. Configuration and function particular to an embodiment can be applied to other embodiments.

The present invention can be used for a fuel cell system. Such fuel cell system is for, for example, vehicles, fixed equipment, industrial purposes, electrical equipment, and so forth.

What is claimed is:

1. A fluid supply valve attachment device comprising:
a tank that has a first inner peripheral surface which forms a mounting hole and a fluid tank chamber that communicates with the mounting hole;
a fixing member that is fit to the mounting hole of the tank, which has a first outer peripheral surface that faces the first inner peripheral surface of the mounting hole, a recessed fitting section that opens toward the fluid tank chamber and is formed radially inside than the first outer peripheral surface, and a second inner peripheral surface that forms the recessed fitting section;
a fluid supply valve which has a second outer peripheral surface, and which is inserted in the recessed fitting section of the fixing member and faces the second inner peripheral surface of the recessed fitting section;
a first seal member that is provided between the first inner peripheral surface of the mounting hole and the first outer peripheral surface of the fixing member and is formed of a ring-shaped sealing material to seal a space between the first inner peripheral surface of the mounting hole and the first outer peripheral surface of the fixing member; and
a second seal member that is provided between the second inner peripheral surface of the fixing member and the second outer peripheral surface of the fluid supply valve, seals a space between the second inner peripheral surface of the fixing member and the second outer peripheral surface of the fluid supply valve, and is formed of a ring-shaped sealing material with a diameter smaller than the first seal member,
wherein the maximum inside diameter of the recessed fitting section is defined as D, a distance between a cross-sectional center of the first seal member and a cross-sectional center of the second seal member in a direction that a central axial line of the recessed fitting section extends is defined as L1, and the distance L1 is set within 2.5×D.

2. The fluid supply valve attachment device according to claim 1, wherein
the distance L1 is set shorter than the diameter or the radius of the second outer peripheral surface of the fluid supply valve.

3. The fluid supply valve attachment device according to claim 1, wherein
the inside diameter of the mounting hole of the tank is defined as De, the distance L1 is set within 0.3×De.

4. The fluid supply valve attachment device according to claim 1, wherein
the first seal member is disposed between the second seal member and the fluid tank chamber in the direction that the central axial line of the recessed fitting section extends.

5. The fluid supply valve attachment device according to claim 1, wherein
the first seal member and the second seal member partially overlap in the direction that the central axial line of the recessed fitting section extends.

6. The fluid supply valve attachment device according to claim 5, wherein
the distance L1 is set within 0.3×D.

7. The fluid supply valve attachment device according to claim 1, wherein
the first seal member and the second seal member completely overlap in the direction that the central axial line of the recessed fitting section extends.

8. The fluid supply valve attachment device according to claim 7, wherein
the distance L1 is set to zero.
9. The fluid supply valve attachment device according to claim 1, wherein
the fluid tank chamber of the tank stores hydrogen.
10. The fluid supply valve attachment device according to claim 1, wherein
the recessed fitting section of the fixing member has a stopper surface at a position adjacent to the fluid tank chamber in the direction that the central axial line of the recessed fitting section extends, and
the fluid supply valve has a flange, and a contact surface that is formed on the flange and contacts the stopper surface.
11. The fluid supply valve attachment device according to claim 10,
wherein the recessed fitting section of the fixing member has a bottom surface at a position opposite to the stopper surface in the direction that the central axial line of the recessed fitting section extends,
the fluid supply valve has a protruded insertion section which is inserted in the recessed fitting section, and
a gap is formed between an end of the protruded insertion section and the bottom surface of the recessed fitting section in a state where the protruded insertion section is inserted in the recessed fitting section and the contact surface contacts the stopper surface.
12. A fluid supply valve attachment device comprising:
a tank that has a first inner peripheral surface which forms a mounting hole and a fluid tank chamber that communicates with the mounting hole;
a fixing member that is fit to the mounting hole of the tank, which has a first outer peripheral surface that faces the first inner peripheral surface of the mounting hole, a recessed fitting section that opens toward the fluid tank chamber and is formed radially inside than the first outer peripheral surface, and a second inner peripheral surface that forms the recessed fitting section;
a fluid supply valve which has a second outer peripheral surface, and which is inserted in the recessed fitting section of the fixing member and faces the second inner peripheral surface of the recessed fitting section;
a first seal member that is provided between the first inner peripheral surface of the mounting hole and the first outer peripheral surface of the fixing member and is formed of a ring-shaped sealing material to seal a space between the first inner peripheral surface of the mounting hole and the first outer peripheral surface of the fixing member; and
a second seal member that is provided between the second inner peripheral surface of the fixing member and the second outer peripheral surface of the fluid supply valve, seals a space between the second inner peripheral surface of the fixing member and the second outer peripheral surface of the fluid supply valve, and is formed of a ring-shaped sealing material with a diameter smaller than the first seal member,
wherein a distance between a cross-sectional center of the first seal member and a cross-sectional center of the second seal member in a direction that a central axial line of the recessed fitting section extends is defined as L1, and the distance L1 is set shorter than the diameter or the radius of the second outer peripheral surface of the fluid supply valve.
13. A fluid supply valve attachment device comprising:
a tank that has a first inner peripheral surface which forms a mounting hole and a fluid tank chamber that communicates with the mounting hole;
a fixing member that is fit to the mounting hole of the tank, which has a first outer peripheral surface that faces the first inner peripheral surface of the mounting hole, a recessed fitting section that opens toward the fluid tank chamber and is formed radially inside than the first outer peripheral surface, and a second inner peripheral surface that forms the recessed fitting section;
a fluid supply valve which has a second outer peripheral surface, and which is inserted in the recessed fitting section of the fixing member and faces the second inner peripheral surface of the recessed fitting section;
a first seal member that is provided between the first inner peripheral surface of the mounting hole and the first outer peripheral surface of the fixing member and is formed of a ring-shaped sealing material to seal a space between the first inner peripheral surface of the mounting hole and the first outer peripheral surface of the fixing member; and
a second seal member that is provided between the second inner peripheral surface of the fixing member and the second outer peripheral surface of the fluid supply valve, seals a space between the second inner peripheral surface of the fixing member and the second outer peripheral surface of the fluid supply valve, and is formed of a ring-shaped scaling material with a diameter smaller than the first seal member,
wherein an inside diameter of the mounting hole of the tank is defined as De, a distance between a cross-sectional center of the first seal member and a cross-sectional center of the second seal member in a direction that a central axial line of the recessed fitting section extends is defined as L1, and the distance L1 is set within 0.3×De.

* * * * *